(12) United States Patent
Nilsson et al.

(10) Patent No.: US 12,090,898 B2
(45) Date of Patent: Sep. 17, 2024

(54) CHILD SEAT, A CHILD SEAT SYSTEM, AND A METHOD FOR OPERATING A CHILD SEAT SYSTEM

(71) Applicants: Ningbo Geely Automobile Research & Development Co., Ltd., Ningbo (CN); Zhejiang Geely Holding Group Co., Ltd., Zhejiang (CN)

(72) Inventors: Magnus Nilsson, Floda (SE); Johan Setterberg, Gothenburg (SE)

(73) Assignees: Ningbo Geely Automobile Research & Dev. Co., Ltd., Ningbo (CN); Zhejiang Geely Holding Group Co., Ltd., Zhejiang (CN)

( * ) Notice: Subject to any disclaimer, the term of this patent is extended or adjusted under 35 U.S.C. 154(b) by 109 days.

(21) Appl. No.: 17/838,071

(22) Filed: Jun. 10, 2022

(65) Prior Publication Data
US 2022/0297579 A1    Sep. 22, 2022

Related U.S. Application Data

(63) Continuation of application No. PCT/CN2020/137160, filed on Dec. 17, 2020.

(30) Foreign Application Priority Data

Jan. 8, 2020 (EP) .................................... 20150716

(51) Int. Cl.
*B60N 2/28* (2006.01)
*B60N 2/56* (2006.01)

(52) U.S. Cl.
CPC ............ *B60N 2/28* (2013.01); *B60N 2/5621* (2013.01); *B60N 2/5657* (2013.01); *B60N 2/5692* (2013.01)

(58) Field of Classification Search
CPC ....... B60N 2/28; B60N 2/5621; B60N 2/5657
See application file for complete search history.

(56) References Cited

U.S. PATENT DOCUMENTS

| 6,079,781 A * | 6/2000 | Tilley | B60N 2/5657 |
| | | | 297/487 |
| 6,106,057 A * | 8/2000 | Lee | B60N 2/28 |
| | | | 297/250.1 |

(Continued)

FOREIGN PATENT DOCUMENTS

| CN | 205022411 U | 2/2016 |
| CN | 205113087 U | 3/2016 |

(Continued)

OTHER PUBLICATIONS

International Search Report from International Application No. PCT/CN2020/137160, mailed on Mar. 16, 2021, 3 pages.

*Primary Examiner* — David R Dunn
*Assistant Examiner* — Tania Abraham
(74) *Attorney, Agent, or Firm* — Tucker Ellis LLP (57) ABSTRACT

A child seat for a vehicle is configured for holding a child within an interior compartment of the vehicle. The child seat includes a climate arrangement adapted for effecting a climate for the child when positioned in the child seat. The climate arrangement includes a power connection interface connectable to a power source. The climate arrangement further includes a data connection interface connectable to a vehicle climate control module and adapted for receiving climate control information from the vehicle climate control module for effecting the climate for the child when positioned in the child seat.

19 Claims, 3 Drawing Sheets

(56) References Cited

U.S. PATENT DOCUMENTS

| | | | |
|---|---|---|---|
| 7,320,223 B1 | 1/2008 | Dabney | |
| 9,937,830 B1* | 4/2018 | Curry, V | B60N 2/879 |
| 10,252,645 B1* | 4/2019 | Peterson | B60N 2/2872 |
| 10,640,019 B1* | 5/2020 | St. Onge | A47C 7/744 |
| 2009/0277190 A1 | 11/2009 | Piette | |
| 2010/0133883 A1 | 6/2010 | Walker | |
| 2014/0136049 A1 | 5/2014 | Kurtovic | |
| 2016/0347213 A1* | 12/2016 | Pretta | H05B 47/125 |
| 2017/0318612 A1* | 11/2017 | Gu | H04W 52/0206 |
| 2018/0134116 A1* | 5/2018 | Chen | B60N 2/976 |
| 2019/0001851 A1 | 1/2019 | Beard | |
| 2021/0039530 A1* | 2/2021 | Wilson | B60N 2/5685 |
| 2021/0078471 A1* | 3/2021 | Fujita | B60N 2/58 |

FOREIGN PATENT DOCUMENTS

| | | |
|---|---|---|
| CN | 106534387 A | 3/2017 |
| CN | 108544993 A | 9/2018 |
| CN | 110091772 A | 8/2019 |
| CN | 110371000 A | 10/2019 |
| EP | 0419722 B1 | 4/1991 |
| JP | 2003034167 A | 2/2003 |
| JP | 2003116665 A | 4/2003 |
| JP | 5446049 B2 | 3/2014 |
| WO | 2002053411 A2 | 7/2002 |

\* cited by examiner

CHILD SEAT, A CHILD SEAT SYSTEM, AND A METHOD FOR OPERATING A CHILD SEAT SYSTEM

RELATED APPLICATION DATA

This application is a continuation of International Patent Application No. PCT/CN2020/137160, filed Dec. 17, 2020, which claims the benefit of European Patent Application No. 20150716.7, filed Jan. 8, 2020, the disclosures of which are incorporated herein by reference in their entireties.

TECHNICAL FIELD

The present disclosure relates to a child seat for a vehicle. The child seat is configured for holding a child within an interior compartment of the vehicle. The child seat comprises a climate arrangement adapted for effecting a climate for the child when positioned in the child seat. The disclosure further relates to a child seat system, and a method for operating a child seat system.

BACKGROUND

Child seats are commonly used when transporting children in vehicles for increased safety. The child seat is providing protection for a child positioned in the child seat in a crash event. In many countries, the use of a child seat is a legal requirement when transporting smaller children. A common issue with traditional child seats are that they are blocking the functions of the main climate system of the vehicle, and since children are sensitive to high and low temperatures they need good climate control when travelling in the vehicle. Traditional child seat systems are not providing efficient climate regulation for the child seated in the child seat. Further, traditional child seats are often not providing an energy efficient solution for the vehicle climate system when installed in the vehicle, due to the blocked functions. There is thus a need for an improved child seat system.

SUMMARY

An object of the present disclosure is to provide a child seat for a vehicle, a child seat system, and a method for operating a child seat system, where the previously mentioned problems are avoided. This object is at least partly achieved by the features of the independent claims. The dependent claims contain further developments of the child seat, the child seat system, and the method for operating a child seat system.

The disclosure concerns a child seat for a vehicle. The child seat is configured for holding a child within an interior compartment of the vehicle. The child seat comprises a climate arrangement adapted for effecting a climate for the child when positioned in the child seat. The climate arrangement comprises a power connection interface connectable to a power source. The climate arrangement further comprises a data connection interface connectable to a vehicle climate control module and adapted for receiving climate control information from the vehicle climate control module for effecting the climate for the child when positioned in the child seat.

Advantages with these features are that the child seat can be integrated into the main climate system of the vehicle. In this way, the child seat is not blocking the functions of the main climate system of the vehicle, and the climate for a child positioned in the child seat can be efficiently controlled with the vehicle climate control module. The child seat with the features described can provide efficient climate regulation for the child seated in the child seat. The climate arrangement is effecting a suitable climate for the child when positioned in the child seat. The power connection interface is connected to a power source for providing power to the climate arrangement. The connection to the vehicle climate control module is used for receiving climate control information for an efficient climate control function for effecting the climate for the child when positioned in the child seat, which also is securing an energy efficient solution.

According to an aspect of the disclosure, the climate arrangement comprises one or more thermoelectric elements connected to the power connection interface and the data connection interface. The one or more thermoelectric elements are adapted for regulating a temperature of the child seat. The thermoelectric elements are used for efficiently regulating the temperature of the child seat, and by using thermoelectric elements, the child seat may be heated or cooled depending on a desired climate for the child positioned in the child seat. Thermoelectric elements are simple in construction and suitable for child seat heating and cooling applications.

According to another aspect of the disclosure, the one or more thermoelectric elements are arranged in a seat structure, and/or a backrest structure, and/or a headrest structure of the child seat. By heating or cooling the seat structure, and/or the backrest structure, and/or the headrest structure of the child seat, the climate for the child positioned in the child seat can be efficiently controlled and regulated. The thermoelectric elements may easily be integrated in the respective structures of the child seat and connected to the power source via the power connection interface, and connected to the vehicle climate control module via the data connection interface.

According to an aspect of the disclosure, the one or more thermoelectric elements are arranged as electric heating elements and/or Peltier elements adapted for heating and/or cooling the child seat. Heating elements are used for efficiently heating the child seat, and Peltier elements may be used for efficiently heating or cooling the child seat depending on how they are integrated into the child seat.

According to another aspect of the disclosure, the climate arrangement comprises one or more air nozzles and a fan unit connected to the one or more air nozzles. The fan unit is adapted for creating a flow of air through the one or more air nozzles. The fan unit is connected to the power connection interface and the data connection interface, and the fan unit and the one or more air nozzles are adapted for regulating a ventilation of the child seat. By ventilating the child seat or the environment surrounding the child seat with the fan unit and the one or more air nozzles, the climate for the child positioned in the child seat can be efficiently controlled and regulated. The fan unit and the one or more air nozzles may easily be integrated in the child seat, and connected to the power source via the power connection interface, and to the vehicle climate control module via the data connection interface.

According to an aspect of the disclosure, the one or more air nozzles are arranged in a seat structure and/or a backrest structure, and/or a headrest structure of the child seat. The one or more air nozzles are adapted for directing a flow of air through an air-permeable outer cover structure of the child seat. The outer cover of the child seat may with this construction be ventilated, and a flow of air may be transported through the outer cover. The ventilation through the outer cover is providing an efficient climate control function for the child when positioned in the child seat.

According to a further aspect of the disclosure, the climate arrangement comprises a valve unit arranged between the one or more air nozzles and the fan unit. The valve unit is adapted for controlling the flow of air through the one or more air nozzles. The valve unit is connected to the power connection interface and the data connection interface. The valve unit may be regulated in different positions for controlling the amount of air flowing out from the one or more air nozzles. The valve unit is connected to the vehicle climate control module via the power connection interface for efficiently controlling the flow of air.

According to an aspect of the disclosure, the data connection interface is a wireless connection interface. The wireless connection is efficiently connecting the climate arrangement of the child seat and the vehicle climate control module without the need for cables or other similar connection means.

According to another aspect of the disclosure, the child seat comprises the power source, and the power source is a battery unit connected to the power connection interface. Through the integration of the power source in the child seat, the child seat may be easily removed from and installed in the vehicle without connecting and disconnecting the child seat from an external power source. This may for example be suitable if using the child seat in different vehicles.

According to a further aspect of the disclosure, the child seat comprises a child detection sensor adapted for detecting a presence of the child in the child seat. Through the detection of a child in the child seat, the climate can be controlled in a suitable way. When a child is detected, the vehicle climate control module can control the climate functions of the child seat and the vehicle in an efficient way. It is further possible to control the vehicle climate system to deactivate a climate zone of the vehicle in which the child seat is positioned if no child is seated in the child seat, which is providing an energy efficient solution. The child detection sensor may further be arranged to detect an area of the child seat that is covered by the child when seated, and this information can be used for activating or deactivating the one or more thermoelectric elements arranged in the child seat for an energy efficient solution. For example, only the thermoelectric elements covered by the child when seated may be activated.

According to an aspect of the disclosure, the child seat comprises a clothes detection sensor adapted for detecting an amount of clothes worn by the child in the child seat. Through the detection of the amount of clothes worn by the child, the climate for the child can be controlled in a suitable way depending on the amount of clothes detected. If a child is wearing clothes with highly insulating materials, the climate may be cooler compared to a situation where a child is only wearing a thin layer of clothing. Less heat is then used for an energy efficient solution if the child is wearing thicker clothes.

According to another aspect of the disclosure, the child seat comprises a sleeping detection sensor adapted for detecting if the child in the child seat is sleeping. A sleeping child may need a different climate compared to when a child is awake. Through the sleeping detection, the climate can be efficiently controlled to suit the child when sleeping.

The disclosure further concerns a child seat system for a vehicle comprising a child seat as described above and a vehicle climate control module. The child seat comprises a climate arrangement adapted for effecting a climate for a child when positioned in the child seat. The climate arrangement comprises a power connection interface connectable to a power source. The climate arrangement further comprises a data connection interface connectable to the vehicle climate control module and adapted for receiving climate control information from the vehicle climate control module for effecting the climate for the child when positioned in the child seat. Advantages with the system is that the child seat is integrated into the main climate system of the vehicle. The child seat with the features described can provide efficient climate regulation for the child seated in the child seat, and the climate arrangement is effecting a suitable climate for the child when positioned in the child seat. The power connection interface is connected to a power source for providing power to the climate arrangement, and the data connection interface connected to the vehicle climate control module is used for receiving climate control information from the vehicle climate control module for an efficient climate control function for the child when positioned in the child seat.

According to an aspect of the disclosure, the vehicle climate control module is arranged in the vehicle and adapted for integrating the child seat into the climate system of the vehicle. The vehicle climate control module is adapted for effecting the climate for the child when positioned in the child seat and controlling climate functions of the vehicle. The child seat may be seamlessly integrated in the vehicle, through the connection to the vehicle climate control module. The integration of the child seat is providing a system where the child seat is an integrated part of the vehicle's climate system for efficiently controlling different vehicle climate functions.

According to another aspect of the disclosure, the system comprises a child seat position detection sensor arranged in the vehicle and/or the child seat. The child seat position detection sensor is adapted for detecting the position of the child seat within an interior compartment of the vehicle. The vehicle climate control module is adapted for controlling the climate functions of the vehicle and effecting the climate for the child when positioned in the child seat in response to a detected position of the child seat. Through the detection of the position of the child seat in the vehicle, the climate functions of the vehicle and the child seat can be efficiently controlled based on the detected position, which also is providing an energy efficient solution.

According to a further aspect of the disclosure, the system comprises a child detection sensor arranged in the vehicle and/or the child seat. The child detection sensor is adapted for detecting a presence of the child in the child seat. The vehicle climate control module is adapted for controlling the climate functions of the vehicle and effecting the climate for the child when positioned in the child seat in response to the detected presence of the child in the child seat. Through the detection of a child in the child seat, the climate can be controlled in an efficient and suitable way. When a child is detected, the vehicle climate control module can control the climate functions of the child seat and the vehicle based on the detected child in the child seat. The vehicle climate system can be controlled to deactivate a climate zone of the vehicle in which the child seat is positioned if no child is seated in the child seat, for an energy efficient solution. The child detection sensor may further be arranged to detect an area of the child seat that is covered by the child when seated, and this detection can be used for activating or deactivating the one or more thermoelectric elements arranged in the child seat for an energy efficient solution.

According to an aspect of the disclosure, the system comprises a clothes detection sensor arranged in the vehicle and/or the child seat. The clothes detection sensor is adapted for detecting an amount of clothes worn by the child in the child seat. The vehicle climate control module is adapted for controlling the climate functions of the vehicle and effecting the climate for the child when positioned in the child seat in response to the detected amount of clothes worn by the child in the child seat. Through the detection of the amount of clothes worn by the child, the climate for the child can be controlled in a suitable way depending on the amount of clothes detected. If a child is wearing clothes with highly insulating materials, the climate may be cooler compared to a situation where a child is wearing a thinner layers of clothing, which also is securing an energy efficient solution.

According to another aspect of the disclosure, the system comprises a sleeping detection sensor arranged in the vehicle and/or the child seat. The sleeping detection sensor is adapted for detecting if the child in the child seat is sleeping. The vehicle climate control module is adapted for controlling the climate functions of the vehicle and effecting the climate for the child when positioned in the child seat in response to the detected sleeping child in the child seat. A sleeping child may need a different climate compared to when a child is awake. Through the sleeping detection, the climate can be efficiently controlled to suit the child during sleeping periods.

The disclosure further concerns a method for operating a child seat system for a vehicle. The child seat system comprises a child seat and a vehicle climate control module arranged in the vehicle. The child seat comprises a climate arrangement adapted for effecting a climate for a child when positioned in the child seat. The climate arrangement comprises a power connection interface. The climate arrangement further comprises a data connection interface. The method comprises the steps: arranging the child seat in the vehicle; connecting the connection interface to a power source; connecting the data connection interface to the vehicle climate control module; receiving climate control information from the vehicle climate control module; and effecting the climate for the child when positioned in the child seat based on the climate control information from the vehicle climate control module. With the method, the child seat can be integrated into the main climate system of the vehicle and controlled by the vehicle climate control module. The climate arrangement is effecting a suitable climate for the child when positioned in the child seat. The power connection interface is connected to a power source for powering the climate arrangement. The climate arrangement further comprises a data connection interface and the connection to the vehicle climate control module is used for receiving climate control information from the vehicle climate control module for an efficient climate control function for the child when positioned in the child seat.

According to an aspect of the disclosure, the method further comprises the steps: integrating the child seat into the climate system of the vehicle, and effecting the climate for the child when positioned in the child seat and controlling climate functions of the vehicle with the vehicle climate control module.

BRIEF DESCRIPTION OF THE DRAWINGS

The disclosure will be described in detail in the following, with reference to the attached drawings, in which.

DETAILED DESCRIPTION

Various aspects of the disclosure will hereinafter be described in conjunction with the appended drawings to illustrate and not to limit the disclosure, wherein like designations denote like elements, and variations of the described aspects are not restricted to the specifically shown embodiments, but are applicable on other variations of the disclosure.

Those skilled in the art will appreciate that the steps, services and functions explained herein may be implemented using individual hardware circuitry, using software functioning in conjunction with a programmed microprocessor or general purpose computer, using one or more Application Specific Integrated Circuits (ASICs) and/or using one or more Digital Signal Processors (DSPs). It will also be appreciated that when the present disclosure is described in terms of a method, it may also be embodied in one or more processors and one or more memories coupled to the one or more processors, wherein the one or more memories store one or more programs that perform the steps, services and functions disclosed herein when executed by the one or more processors.

Figure 1:
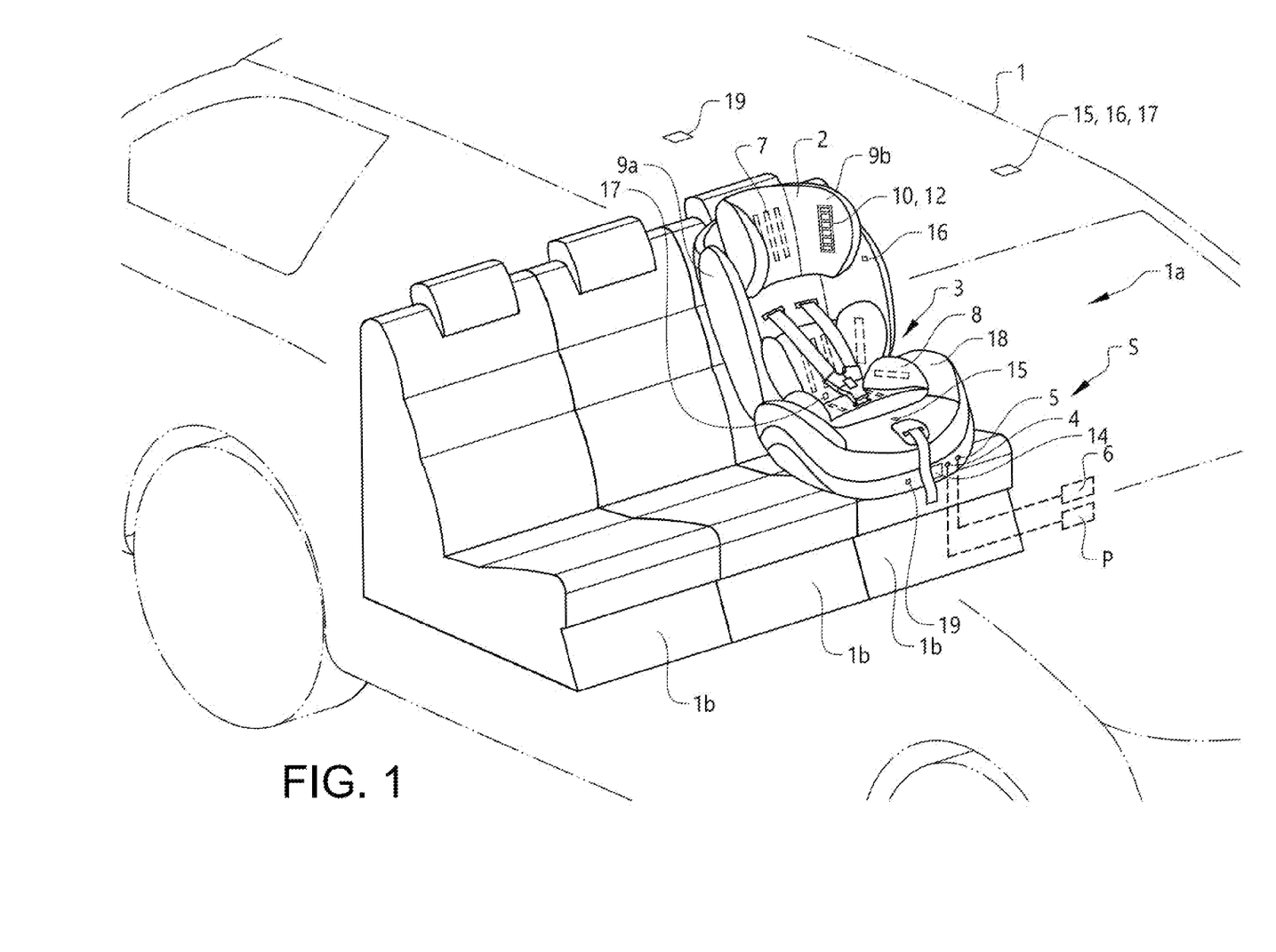
FIG. 1 shows schematically, in a perspective view, an interior compartment of a vehicle with an installed child seat according to the disclosure.

FIG. 1 schematically shows a child seat 2 for a vehicle 1. The child seat 2 may be removably attachable to an interior compartment 1a of the vehicle 1, where the child seat 2 is placed on one of the vehicle seats 1b of the vehicle 1 as schematically illustrated in FIG. 1. The child seat 2 may be placed on any suitable vehicle seat 1b, such as for example a front seat, a rear seat or intermediate seat. The child seat 2 may alternatively be configured as a child seat arrangement integrated in a seat construction of the vehicle 1, or a child seat construction permanently installed in the vehicle 1. The child seat 2 may have a traditional configuration and design with a seat structure 8, a backrest structure 9a, and a headrest structure 9b. It should be understood that the backrest structure 9a and the headrest structure 9b may be integrated into a common structure or alternatively arranged as separate structures. The headrest structure 9b may for example be arranged as an adjustable part of the child seat 2 connected to the backrest structure 9a. The respective structures may further be provided with padding and an outer cover structure 18, where the outer cover structure 18 may be made of suitable fabrics or other suitable materials. The outer cover structure 18 may be removably arranged on the child seat 2. The respective structures of the child seat may each have its own outer cover structure 18, or the outer cover structure 18 may be arranged to cover two or more of the structures.

Figure 3:
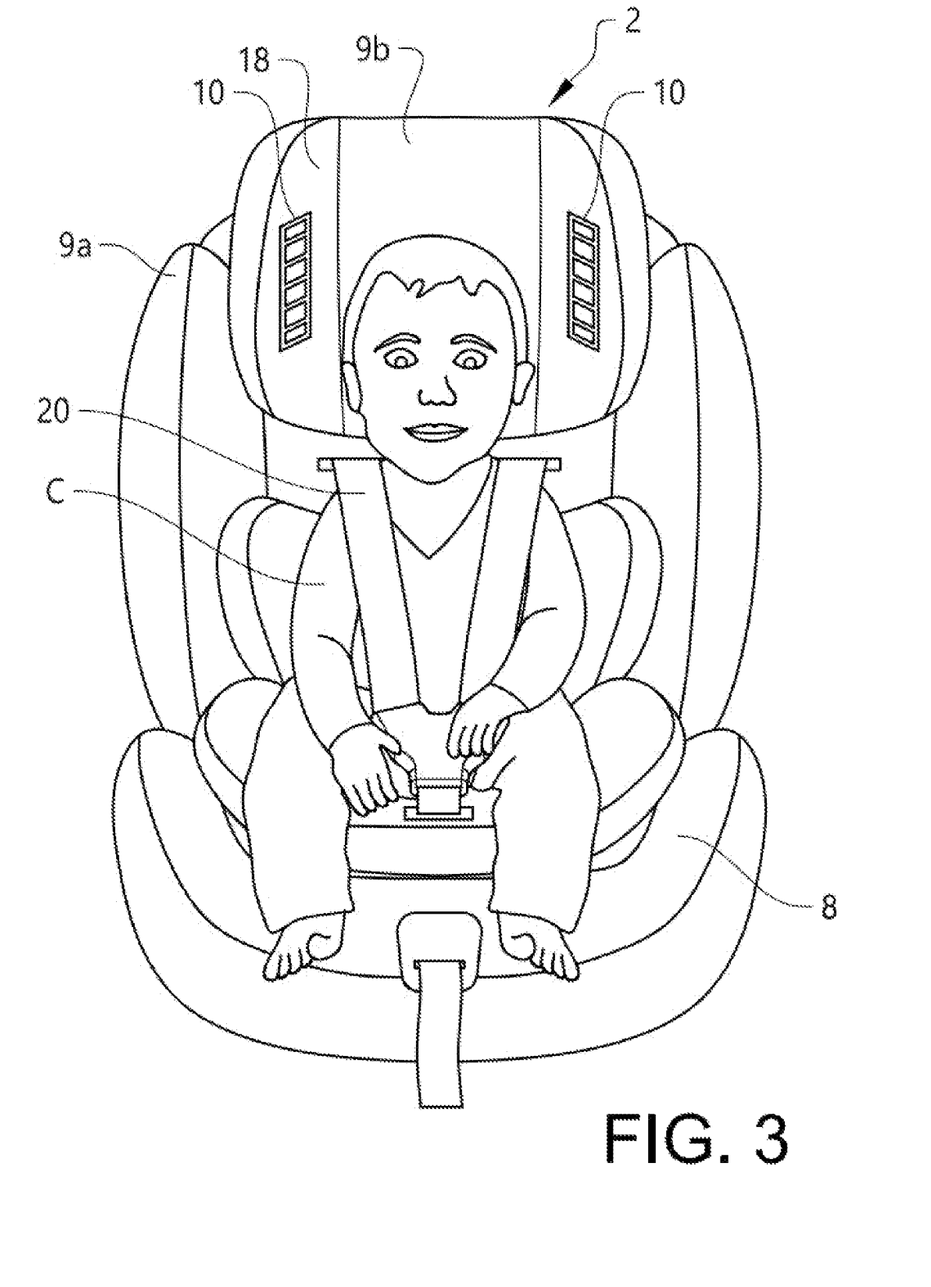
FIG. 3 shows schematically, in a front view, the child seat with a seated child according to the disclosure.

The child seat 2 is configured for holding a child C within an interior compartment 1a of the vehicle 1, as illustrated in FIGS. 1 and 3. The child seat 2 may be arranged with seat belt arrangement 20 to hold the child C safely in the child seat 2 during driving.

Figure 2A:
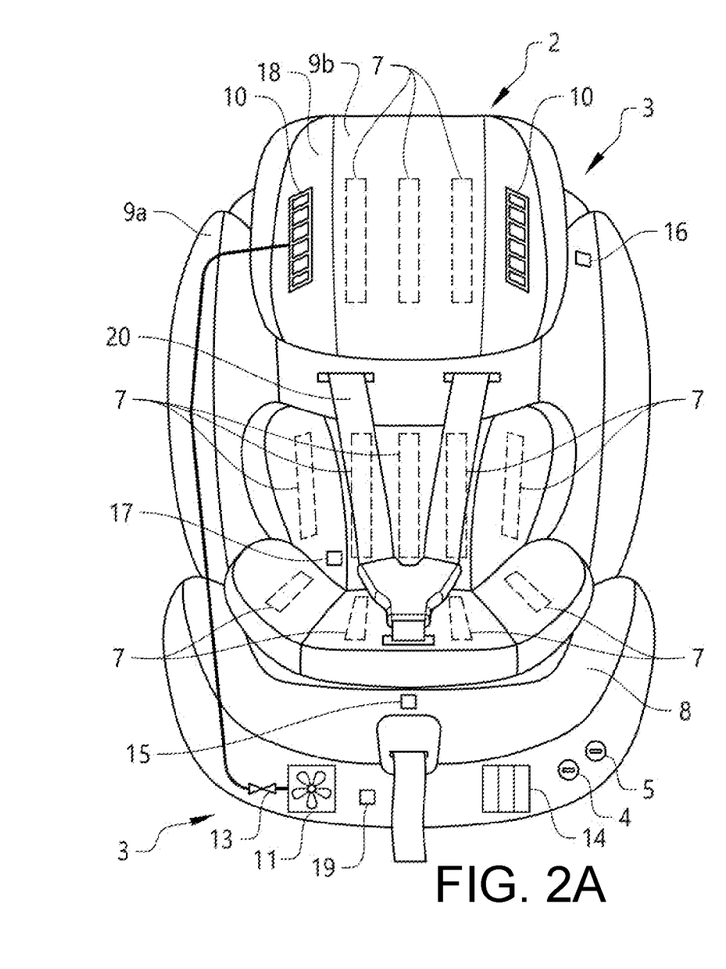
FIG. 2A-2B show schematically, in front views, the child seat according to the disclosure.
Figure 2B:
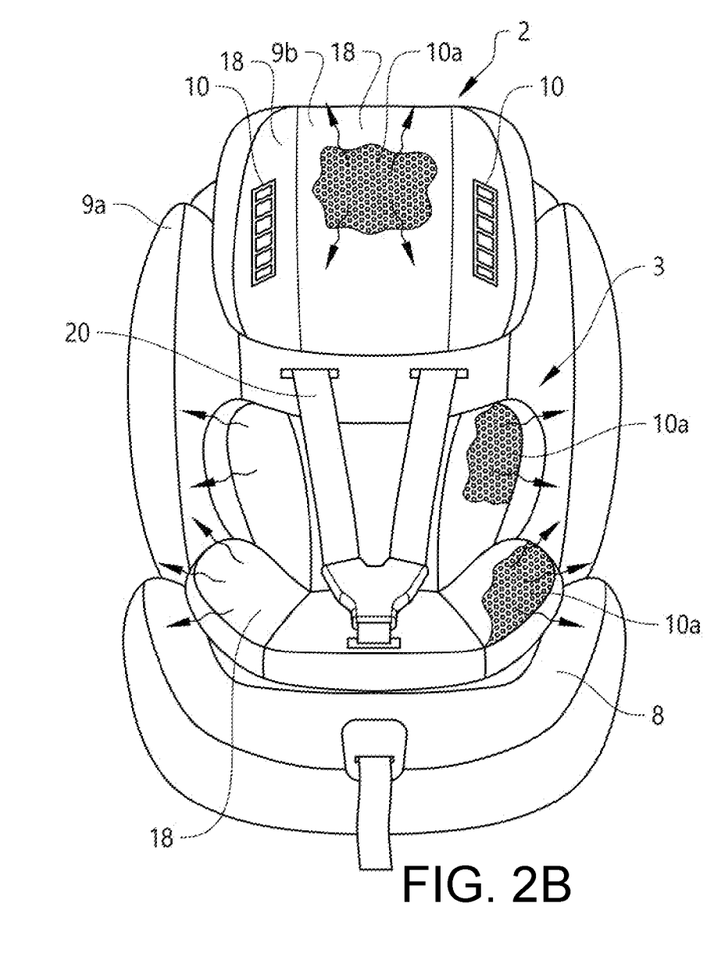

As schematically illustrated in FIGS. 1 and 2A-2B, the child seat 2 comprises a climate arrangement 3 adapted for effecting a climate for the child C, when the child C is positioned in the child seat 2. The climate arrangement 3 may for example regulate a temperature for the child C or a flow of air in connection to the child C, as will be further described below. The climate arrangement 3 comprises a power connection interface 4, which is connectable to a power source P. The climate arrangement 3 further comprises a data connection interface 5, which is connectable to a vehicle climate control module 6. The vehicle climate control module 6 is controlling the climate functions of the vehicle 1 and the climate functions of the child seat 2.

The power source P is providing power to the climate arrangement 3, and the power connection interface 4 is used for connecting the climate arrangement 3 to the power source P. The power connection interface 4 may for example be arranged as a traditional plug or socket arrangement, and with such a configuration, a power cable can be used for connecting the power source P to the power connection interface 4. The power source P may for example be a battery arranged in the vehicle 1, or another power unit of the power system of the vehicle 1. The vehicle 1 may be equipped with a plug or socket arrangement suitable for connecting the climate arrangement 3 of the child seat 2 to the power source P via the connection interface 4. In an alternative embodiment, the connection interface 4 may be configured as a wireless power receiving unit that is part pf a wireless power transfer system. The wireless power receiving unit is in this embodiment cooperating with a suitable wireless power transfer unit arranged in the vehicle 1. Any suitable type of wireless power transfer arrangement can be used to transmit power to the child seat 2. In a further alternative embodiment, the child seat 2 may comprise the power source P, such as for example a battery unit 14 arranged in the seat structure 8, as schematically illustrated in FIG. 2A. The battery unit 14 is connected to the power connection interface 4 for providing power to the climate arrangement 3. By using a battery unit arranged in the child seat 2, a flexible solution is achieved, which may be suitable when removing the child seat 2 from the vehicle 1 or when using the child seat 2 in different vehicles. The battery unit 14 may for example be charged through a connection to an external power source P.

As described above, the climate arrangement 3 further comprises the data connection interface 5 connectable to the vehicle climate control module 6. The vehicle climate control module 6 is arranged in the vehicle 1 and is configured as a control unit for controlling the different climate functions of the vehicle 1. The vehicle climate control module 6 is adapted for integrating the child seat 2 into the climate system of the vehicle 1, and the vehicle climate control module 6 is adapted for effecting the climate for the child C when positioned in the child seat 2 and controlling climate functions of the vehicle 1.

The vehicle climate control module 6 may be used for adjusting the heating and air conditioning to keep interior compartment 1a of the vehicle 1 heated and cooled. Depending on the vehicle, this can include temperature readings inside the cabin and adjustments to the HVAC system of the vehicle 1 through the use of different sensors and actuators. In an automated vehicle climate system the vehicle climate control module 6 is, based on different climate input parameters from sensors, monitoring and influencing the climate of the interior compartment 1a without manual intervention. The sensor readings are matched to the climate setting defined by the occupants of the vehicle through the vehicle climate control module 6, and the climate of the interior compartment 1a is adjusted accordingly.

The data connection interface 5 is adapted for receiving climate control information from the vehicle climate control module 6 for effecting the climate for the child C when positioned in the child seat 2. The data connection interface 5 may for example be configured as a plug and socket arrangement for connecting a data cable to the vehicle climate control module 6. The vehicle 1 may be equipped with a corresponding plug and socket arrangement connected to the vehicle climate control module 6 for connecting the data cable between the child seat 2 and the vehicle 1. The vehicle climate control module 6 is sending climate control information to and receiving climate control information from the climate arrangement 3. The climate control information may be any type of information, signals, or data needed for controlling the climate arrangement 3 in order for effecting the climate for the child C positioned in the child seat 2. Based on the received information from the vehicle climate control module 6, the climate arrangement 3 is adjusting or maintaining the climate for the child C. The vehicle climate control module 6 may further be connected to a climate parameter input source, such as for example an input control device, for inputting a temperature or ventilation value. In an alternative embodiment, the data connection interface 5 is a wireless connection interface. With a wireless connection interface, the information between the vehicle climate control module 6 and the climate arrangement 3 can be transmitted without the need for cables. Any suitable type of wireless transmission equipment and wireless data transmission protocol may be used for the wireless connection between the vehicle climate control module 6 and the climate arrangement 3 via the data connection interface 5.

The climate arrangement 3 may as illustrated in FIGS. 1 and 2A comprise one or more thermoelectric elements 7. The one or more thermoelectric elements 7 are connected to the power connection interface 4 and the data connection interface 5, and the thermoelectric elements 7 are adapted for regulating the temperature of the child seat 2. The one or more thermoelectric elements 7 may be arranged in any of the seat structure 8, the backrest structure 9a, and the headrest structure 9b of the child seat 2. In the embodiment shown in FIG. 2A, the thermoelectric elements 7 are arranged in the seat structure 8, the backrest structure 9a, and the headrest structure 9b.

The one or more thermoelectric elements 7 may be arranged as traditional electric heating elements for heating the child seat 2. The electric heating elements may for example be of resistor-type elements, induction elements, or other suitable types of heating elements. Alternatively or in combination with traditional electric heating elements, Peltier elements can be used for heating and/or cooling the child seat 2. Thus, a combination of different thermoelectric elements 7 may be used if desired to achieve desired heating and cooling properties. In an alternative embodiment, thermoelectric fabrics may be used as the thermoelectric elements 7. The outer cover structure 18 of the child seat 2 may fully or partly be made of thermoelectric fabrics for providing heating or cooling. Depending on the input information from the vehicle climate control module 6, the thermoelectric elements 7 are regulating the temperature in the child seat 2.

As schematically illustrated in FIGS. 1, 2A-2B, and 3, the climate arrangement 3 may further comprise one or more air nozzles 10 and a fan unit 11 connected to the one or more air nozzles 10. The one or more air nozzles 10 may be arranged in the seat structure 8, and/or the backrest structure 9a, and/or the headrest structure 9b of the child seat 2. In the embodiment illustrated in FIG. 2A, the air nozzles 10 are arranged in the headrest structure 9b. The fan unit 11 is adapted for creating a flow of air through the one or more air nozzles 10. The one or more nozzles 10 may be connected to the fan unit 11 with hoses, air ducts, or similar arrangements for distributing the flow of air from the fan unit 11 to the one or more nozzles 10. The fan unit 11 is connected to the power connection interface 4 and the data connection interface 5, and the fan unit 11 and the one or more air nozzles 10 are adapted for regulating a ventilation of the child seat 2. Depending on the input information from the vehicle climate control module 6, the fan unit 11 is regulating the flow of air from the one or more nozzles 10. The air may if suitable for the child seat construction be heated or cooled with a conventional air cooling and heating arrangement. The one or more air nozzles 10 may be adjustable in order to direct the flow of air into a desired direction. In an alternative embodiment, the one or more air nozzles 10 may comprise a motorized air vent 12, connected to the power connection interface 4 and the data connection interface 5 for directing the flow of air in response to information provided from the vehicle climate control module 6. The climate arrangement 3 may further comprise a valve unit 13 arranged between the one or more air nozzles 10 and the fan unit 11. The valve unit 13 is adapted for controlling the flow of air through the one or more air nozzles 10. The valve unit 13 is connected to the power connection interface 4 and the data connection interface 5, and is controlled by the vehicle climate control module 6. The valve unit 13 may for example be arranged in or in connection to the hoses, air ducts, or similar arrangements distributing the flow of air from the fan unit 11 to the one or more nozzles 10. The valve unit 13 may be of any suitable type for vehicle air flow applications.

In an alternative embodiment, as schematically illustrated in FIG. 2B, one or more air nozzles 10*a* are arranged in the seat structure 8, and/or the backrest structure 9*a*, and/or the headrest structure 9*b* of the child seat 2, underneath the outer cover structure 18. The outer cover structure 18 may be arranged as an air-permeable cover, where the one or more air nozzles 10*a* are adapted for directing the flow of air through the air-permeable outer cover structure 18. The respective structure of the child seat 2 may be arranged with a plurality of air nozzles 10*a* in the form of small orifices or openings connected to the fan unit 11. The air flow from the fan unit 11 is distributed through the plurality of air nozzles 10*a* and further distributed through the air-permeable outer cover structure 18, for effecting the climate for the child (C) when positioned in the child seat (2).

The child seat 2 may further comprise a child detection sensor 15 adapted for detecting a presence of the child C in the child seat 2, as for example schematically illustrated in FIGS. 1 and 2A. The child detection sensor 15 is connected to the vehicle climate control module 6 via the data connection interface 5. The child detection sensor 15 is further connected to the power connection interface 4 for receiving power. The detection of a child C positioned in the child seat 2 can be used as input to the vehicle climate control module 6 for controlling the climate arrangement 3. Through the detection of a child C in the child seat 2, the climate can be controlled in an efficient and suitable way. When a child C is detected, the vehicle climate control module 6 can further control the climate functions of both the child seat 2 and the vehicle 1 based on the detected child C in the child seat 2. In an alternative embodiment, the child detection sensor 15 may instead be arranged in the vehicle 1, as illustrated in FIG. 1, or in both the vehicle 1 and the child seat 2 for effecting the climate for the child C when positioned in the child seat 2 in response to the detected presence of the child C in the child seat 2. The child detection sensor 15 may be any suitable type of sensor, such as for example a weight sensor, a camera and image recognition sensor, an IR sensor, a heat detection sensor, or a heartbeat sensor. The child detection sensor or sensors may have any suitable position in the child seat 2 and/or the vehicle 1. With the child detection sensor 15, the vehicle climate system can for example be controlled to deactivate a climate zone of the vehicle 1 in which the child seat 2 is positioned if no child C is seated in the child seat 2, for an energy efficient solution. The child detection sensor 15 may be arranged to detect an area of the child seat 2 that is covered by the child C when seated, and this detection can be used for activating or deactivating the one or more thermoelectric elements 7 arranged in the child seat 2 for an energy efficient solution.

The child seat 2 may further comprise a clothes detection sensor 16 adapted for detecting an amount of clothes worn by the child C in the child seat 2, as for example schematically illustrated in FIG. 2A. The clothes detection sensor 16 is connected to the vehicle climate control module 6 via the data connection interface 5. The clothes detection sensor 16 is further connected to the power connection interface 4 for receiving power. The detection of the amount of clothes worn by the child C positioned in the child seat can be used as input to the vehicle climate control module 6 for controlling the climate arrangement 3. The vehicle climate control module 6 is adapted for controlling the climate functions of the vehicle 1 and effecting the climate for the child C when positioned in the child seat 2 in response to the detected amount of clothes worn by the child C in the child seat 2. Through the detection of the amount of clothes worn by the child C, the climate for the child C can be controlled in a suitable way depending on the amount of clothes detected. If a child is wearing clothes with highly insulating materials, the climate may be cooler compared to a situation where the child C is wearing thinner layers of clothing. In an alternative embodiment, the clothes detection sensor 16 may be arranged in the vehicle 1, as illustrated in FIG. 1, or both in the vehicle 1 and the child seat 2, for effecting the climate for the child C when positioned in the child seat 2 in response to the detected amount of clothes worn by the child C in the child seat 2. The clothes detection sensor 16 may be any suitable type of sensor, such as for example, a heat camera and image recognition sensor, an IR sensor, or a heat detection sensor. The clothes detection sensor or sensors may have any suitable position in the child seat 2 and/or the vehicle 1.

The child seat 2 may further comprise a sleeping detection sensor 17 adapted for detecting if the child C in the child seat 2 is sleeping, as for example schematically illustrated in FIG. 2A. The sleeping detection sensor 17 is connected to the vehicle climate control module 6 via the data connection interface 5. The sleeping detection sensor 17 is further connected to the power connection interface 4 for receiving power. The vehicle climate control module 6 is adapted for controlling the climate functions of the vehicle 1 and effecting the climate for the child C when positioned in the child seat 2 in response to the detected sleeping child C in the child seat 2. Through the sleeping detection, the climate can be efficiently controlled to suit the child C during sleeping periods. In an alternative embodiment, the sleeping detection sensor 17 is instead arranged in the vehicle 1, as illustrated in FIG. 1, or both in the vehicle 1 and the child seat 2, for effecting the climate for the child C when positioned in the child seat 2 in response to the detected sleeping child C in the child seat 2. The sleeping detection sensor 17 may be any suitable type of sensor, such as for example, a camera and image recognition sensor, an IR sensor, or a heartbeat detection sensor. The sleeping detection sensor or sensors may have any suitable position in the child seat 2 and/or the vehicle 1.

The vehicle 1 and/or the child seat 2 may further comprise a child seat position detection sensor 19, as for example schematically illustrated in FIGS. 1 and 2A. The child seat position detection sensor 19 is adapted for detecting the position of the child seat 2 in the interior compartment 1a of the vehicle 1. The child seat position detection sensor 19 is connected to the vehicle climate control module 6. The vehicle climate control module 6 is adapted for controlling the climate functions of the vehicle 1 and effecting the climate for the child C when positioned in the child seat 2 in response to a detected position of the child seat 2. Through the detection of the position of the child seat 2 in the vehicle 1, the climate functions of the vehicle 1 and the child seat 2 can be efficiently controlled based on the detected position. The child seat position detection sensor 19 may be any suitable type of sensor, such as for example, a camera and image recognition sensor, an IR sensor, a RFID sensor, or a weight sensor. If using weight sensors, the sensors may be arranged in the seats of the vehicle 1 for detecting a specific weight corresponding to the weight of the child seat. The child seat position detection sensor or sensors may have any suitable position in the child seat 2 and/or the vehicle 1.

The child seat 2 and the vehicle climate control module 6 are forming a child seat system S for the vehicle 1, where the child seat system S is controlling the climate and the climate functions of the interior compartment 1a of the vehicle. The child seat 2 may be seamlessly integrated in the vehicle 1 through the connection to the vehicle climate control module 6, and the child seat 2 may form a climate zone controlled together with other climate zones of the interior compartment 1a of the vehicle 1. The integration of the child seat is providing a system where the child seat is an integrated part of the vehicle's 1 climate system for efficiently controlling different vehicle climate functions. The climate arrangement 3 is effecting the climate for the child C when positioned in the child seat 2, via the power connection interface 4 connectable to the power source P, and via the data connection interface 5 connectable to the vehicle climate control module 6. The vehicle climate control module 6 is receiving climate control information from the vehicle climate control module 6 for effecting the climate for the child C when positioned in the child seat 2.

When the child seat 2 is suitably arranged in the interior compartment 1a of the vehicle 1, and connected to the power source P via the power connection interface 4 and to the vehicle climate control module 6 via the data connection interface 5, the child seat system S is ready for being operated. The different sensors described above together with the sensors of the climate control system of the vehicle are collecting information about different parameters that the vehicle climate control module 6 is using for evaluating the climate of the interior compartment 1a of the vehicle 1. The climate arrangement 3, with the thermoelectric elements 7 and/or the fan unit 11, is receiving climate control information from the vehicle climate control module 6, and based on the climate control information from the vehicle climate control module 6, the climate for the child C is effected in response to the climate control information. Climate parameters for the vehicle climate control module 6 may be provided manually to the child seat system S, or the child seat system S may be fully automated.

The present disclosure has been presented above with reference to specific embodiments. However, other embodiments than the above described are possible and within the scope of the disclosure. Different method steps than those described above, performing the method by hardware or software, may be provided within the scope of the disclosure. Thus, according to an exemplary embodiment, there is provided a non-transitory computer-readable storage medium storing one or more programs configured to be executed by one or more processors of the child seat system, the one or more programs comprising instructions for performing the method according to any one of the above-discussed embodiments. Alternatively, according to another exemplary embodiment a cloud computing system can be configured to perform any of the method aspects presented herein. The cloud computing system may comprise distributed cloud computing resources that jointly perform the method aspects presented herein under control of one or more computer program products. Moreover, the processor may be connected to one or more communication interfaces and/or sensor interfaces for receiving and/or transmitting data with external entities such as e.g. sensors arranged on the vehicle surface, an off-site server, or a cloud-based server.

The processor or processors associated with the child seat system may be or include any number of hardware components for conducting data or signal processing or for executing computer code stored in memory. The system may have an associated memory, and the memory may be one or more devices for storing data and/or computer code for completing or facilitating the various methods described in the present description. The memory may include volatile memory or non-volatile memory. The memory may include database components, object code components, script components, or any other type of information structure for supporting the various activities of the present description. According to an exemplary embodiment, any distributed or local memory device may be utilized with the systems and methods of this description. According to an exemplary embodiment the memory is communicably connected to the processor (e.g., via a circuit or any other wired, wireless, or network connection) and includes computer code for executing one or more processes described herein.

It will be appreciated that the above description is merely exemplary in nature and is not intended to limit the present disclosure, its application or uses. While specific examples have been described in the specification and illustrated in the drawings, it will be understood by those of ordinary skill in the art that various changes may be made and equivalents may be substituted for elements thereof without departing from the scope of the present disclosure as defined in the claims. Furthermore, modifications may be made to adapt a particular situation or material to the teachings of the present disclosure without departing from the essential scope thereof. Therefore, it is intended that the present disclosure not be limited to the particular examples illustrated by the drawings and described in the specification as the best mode presently contemplated for carrying out the teachings of the present disclosure, but that the scope of the present disclosure will include any embodiments falling within the foregoing description and the appended claims. Reference signs mentioned in the claims should not be seen as limiting the extent of the matter protected by the claims, and their sole function is to make claims easier to understand.

REFERENCE SIGNS

1: Vehicle
1a: Interior compartment
1b: Vehicle seat
2: Child seat
3: Climate arrangement
4: Power connection interface 5: Data connection interface
6: Vehicle climate control module
7: Thermoelectric element
8: Seat structure
9a: Backrest structure
9b: Headrest structure
10: Air nozzle
10a: Air nozzle
11: Fan unit
12: Air vent
13: Valve unit
14: Battery unit
15: Child detection sensor
16: Clothes detection sensor
17: Sleeping detection sensor
18: Outer cover structure
19: Child seat position detection sensor
20: Seat belt arrangement
S: Child seat system
C: Child
P: Power source

What is claimed is:

1. A child seat for a vehicle, wherein the child seat is configured for holding a child within an interior compartment of the vehicle, the vehicle having a climate system that regulates a climate of the interior compartment of the vehicle under the control of a vehicle climate control module of the climate system of the vehicle, the child seat comprising:
a climate arrangement that regulates a climate for a child positioned in the child seat, wherein the climate arrangement comprises a power connection interface connectable to a power source of the vehicle; and
a data connection interface that establishes data communication between the climate arrangement of the child seat and the vehicle climate control module of the vehicle so as to integrate the climate arrangement of the child seat into the climate system of the vehicle with the child seat as a climate zone of the climate system, wherein the climate arrangement of child seat receives operational climate control commands from the vehicle climate control module over the data connection interface and effectuates climate changes in the climate zone of the child seat in response to the received operational climate control commands.

2. The child seat according to claim 1, wherein the climate arrangement comprises one or more thermoelectric elements connected to the power connection interface and the data connection interface, wherein the one or more thermoelectric elements are adapted for regulating a temperature of the child seat.

3. The child seat according to claim 2, wherein the one or more thermoelectric elements are arranged in a seat structure, and/or a backrest structure, and/or a headrest structure of the child seat.

4. The child seat according to claim 2, wherein the one or more thermoelectric elements are arranged as electric heating elements and/or Peltier elements adapted for heating and/or cooling the child seat.

5. The child seat according to claim 1, wherein the climate arrangement comprises one or more air nozzles and a fan unit connected to the one or more air nozzles, wherein the fan unit is adapted for creating a flow of air through the one or more air nozzles, wherein the fan unit is connected to the power connection interface and the data connection interface, wherein the fan unit and the one or more air nozzles are adapted for regulating a ventilation of the child seat.

6. The child seat according to claim 5, wherein the one or more air nozzles are arranged in a seat structure, and/or a backrest structure, and/or a headrest structure of the child seat, wherein the one or more air nozzles are adapted for directing a flow of air through an air-permeable outer cover structure of the child seat.

7. The child seat according to claim 5, wherein the climate arrangement comprises a valve unit arranged between the one or more air nozzles and the fan unit, wherein the valve unit is adapted for controlling the flow of air through the one or more air nozzles, and wherein the valve unit is connected to the power connection interface and the data connection interface.

8. The child seat according to claim 1, wherein the data connection interface is a wireless connection interface.

9. The child seat according to claim 1, wherein the child seat further comprises a battery unit connected to the power connection interface.

10. The child seat according to claim 1, wherein the child seat comprises a child detection sensor adapted for detecting a presence of the child in the child seat.

11. The child seat according to claim 1, wherein the child seat comprises a clothes detection sensor adapted for detecting an amount of clothes worn by the child in the child seat.

12. The child seat according to claim 1, wherein the child seat comprises a sleeping detection sensor adapted for detecting if the child in the child seat is sleeping.

13. A climate system for a vehicle comprising the child seat according to claim 1 and the vehicle climate control module.

14. The climate system according to claim 13, wherein the vehicle climate control module controls climate functions of the vehicle.

15. The climate system according to claim 13, wherein the system comprises a child seat position detection sensor arranged in the vehicle and/or the child seat, wherein the child seat position detection sensor detects a position of the child seat within an interior compartment of the vehicle, wherein the vehicle climate control module controls climate functions of the vehicle and the child seat in response to the detected position of the child seat.

16. The climate system according to claim 13, wherein the system comprises a child detection sensor arranged in the vehicle and/or the child seat, wherein the child detection sensor detects a presence of the child in the child seat, wherein the vehicle climate control module controls climate functions of the vehicle and the child seat in response to the detected presence of the child in the child seat.

17. The climate system according to claim 13, wherein the system comprises a clothes detection sensor arranged in the vehicle and/or the child seat, wherein the clothes detection sensor that detects an amount of clothes worn by the child in the child seat, wherein the vehicle climate control module controls climate functions of the vehicle and the child seat in response to the detected amount of clothes worn by the child in the child seat.

18. The climate system according to claim 13, wherein the system comprises a sleeping detection sensor arranged in the vehicle and/or the child seat, wherein the sleeping detection sensor detects that the child in the child seat is sleeping, wherein the vehicle climate control module controls climate functions of the vehicle and the child seat in response to the detected sleeping child in the child seat.

19. A method for operating a climate system of a vehicle, wherein the climate system comprises a child seat and a vehicle climate control module arranged in the vehicle, wherein the child seat comprises a climate arrangement that regulates a climate for a child positioned in the child seat, wherein the climate arrangement comprises a power connection interface,
  wherein the climate arrangement further comprises a data connection interface that establishes data communication between the climate arrangement of the child seat and the vehicle climate control module of the vehicle, wherein the method comprises;
  arranging the child seat in the vehicle;
  connecting the power connection interface to a power source of the vehicle;
  establishing the data communication between climate arrangement of the child seat and the vehicle climate control module of the vehicle through the data connection interface so as to integrate the climate arrangement of the child seat into the climate system of the vehicle with the child seat as a climate zone of the climate system;
  receiving, by the climate arrangement of the child seat from the vehicle climate control module, operational climate control commands; and
  effectuating climate changes in the climate zone of the child seat with the climate arrangement of the child seat in response to the received climate control commands.

* * * * *